March 16, 1937.  E. RACZ  2,074,026
CALCULATING MACHINE
Filed May 27, 1933  2 Sheets-Sheet 1
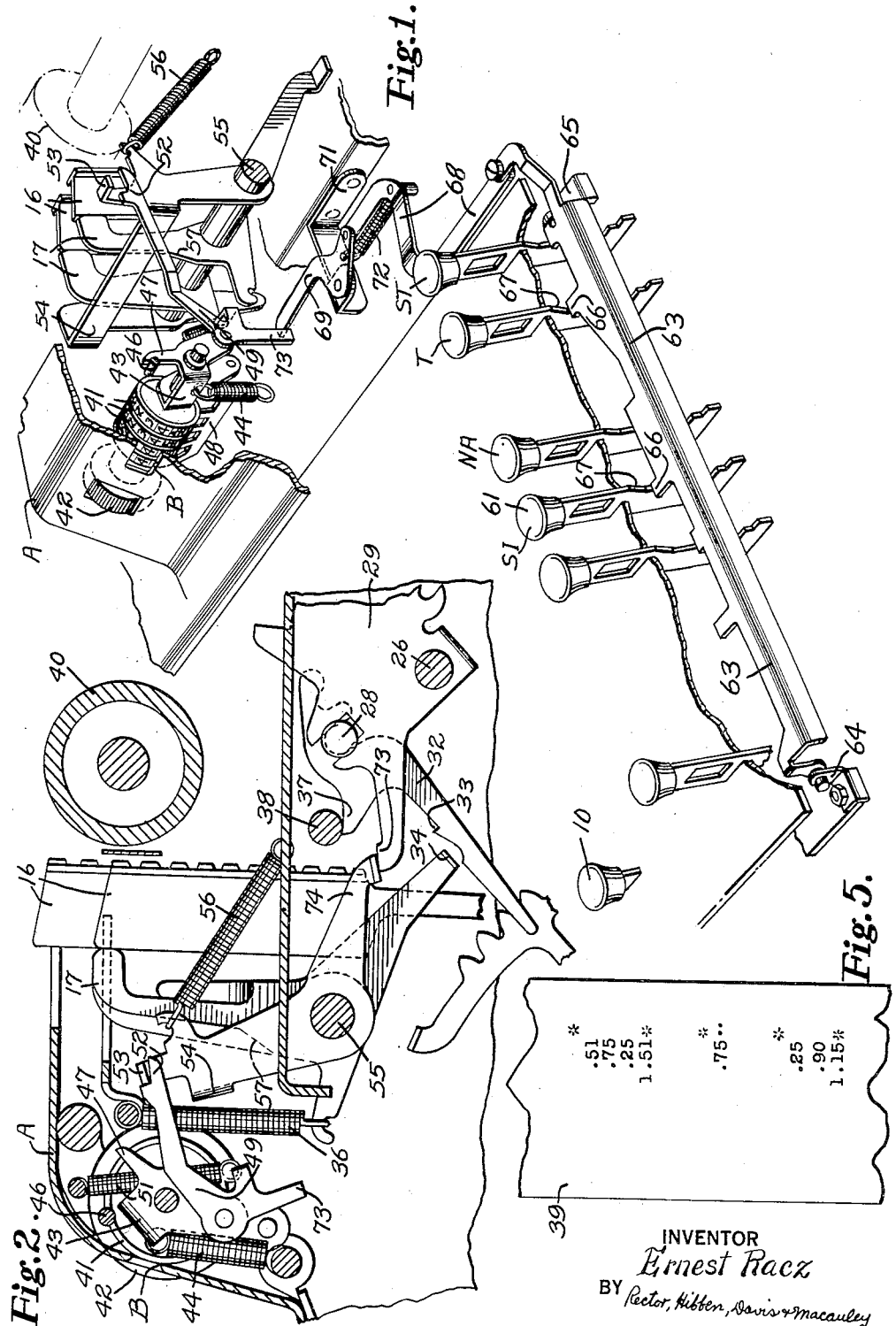
INVENTOR
Ernest Racz
BY Rector, Hibben, Davis & Macauley
ATTORNEYS March 16, 1937.　　　　　E. RACZ　　　　　2,074,026

CALCULATING MACHINE

Filed May 27, 1933　　　　2 Sheets-Sheet 2

INVENTOR
Ernest Racz
BY Rector, Hibben, Davis & Macauley
ATTORNEYS

Patented Mar. 16, 1937

2,074,026

UNITED STATES PATENT OFFICE 2,074,026

CALCULATING MACHINE

Ernest Racz, Detroit, Mich., assignor to Burroughs Adding Machine Company, Detroit, Mich., a corporation of Michigan Application May 27, 1933, Serial No. 673,134

20 Claims. (Cl. 235—60)

This invention relates to a calculating machine and it is directed particularly to a construction for counting the number of transactions of a certain character that take place in the use of the machine, for example, the number of customers served by the operator using the machine.

In many lines of business it is desirable, not only to keep a record for the day of the total sales in dollars, but also to count the number of customers served, so that the proprietor may compute the average sale per customer or make other calculations such, for example, as checking the number of customers against the number of sales slips or tickets turned in by the clerks.

Counters have heretofore been provided upon machines utilized for registering purchases which count each cycle of operation of a calculating machine, but such counters will not give the number of complete transactions, such as customers served, because many transactions involve more than one operation of a machine, that is, a customer may purchase a plurality of items which require several operations of the machine, whereas other purchases may be a single-item transaction. Such purchases are illustrated on the receipt slip shown in the drawings (Fig. 5). Obviously, only one machine operation, preferably the total taking operation, should be counted for a multiple item transaction. Counters have also been provided that will count the number of total taking operations of a calculating machine, but these will not indicate the number of transactions because of the single-item transactions, in which event a so-called "single item" key is often used and no total taking operation is performed.

Also, if every total taking operation is counted, operations would be counted in which the total key is depressed and the machine operated although there is nothing in the register, which sort of operation might occur carelessly but which occurs quite often in testing the machine to see that the register is clear. In fact, in the use of machines where customers are given receipt slips showing the purchases made, the plan of operation contemplates encouraging customers to see that a "clear sign" is printed at the top of their receipt slips, such as shown at the top of the slip illustrated in Fig. 5. This clear sign is, of course, obtained by depressing the total key and operating the machine when there is nothing in the register. Such a sign then indicates to the customer that there was nothing in the register when the clerk started to record and add his purchases. From this it is manifest, as previously stated, that a counter that will count every total taking operation of a machine is not operable to accurately count the number of customers.

The present invention is directed to a solution of this problem and it comprehends providing a counting mechanism that is controlled in a novel manner so that it will operate to count the number of complete transactions, such as customers, no matter whether these customers purchase a single item or a plurality of items.

More particularly the invention comprehends providing an improved construction that will count the cycles of operation of a calculating machine only when said machine is conditioned in a predetermined manner.

Figure 1 is a diagrammatic perspective view of portions of a calculating machine embodying a counter in accordance with this invention;

Fig. 2 is a right side elevation taken within the casing, illustrating the counter and showing the type hammers just at the moment of striking the type bars;

Fig. 5 is a view of a portion of a record strip illustrating those transactions counted and certain of the machine operations not counted.

Figure 3:
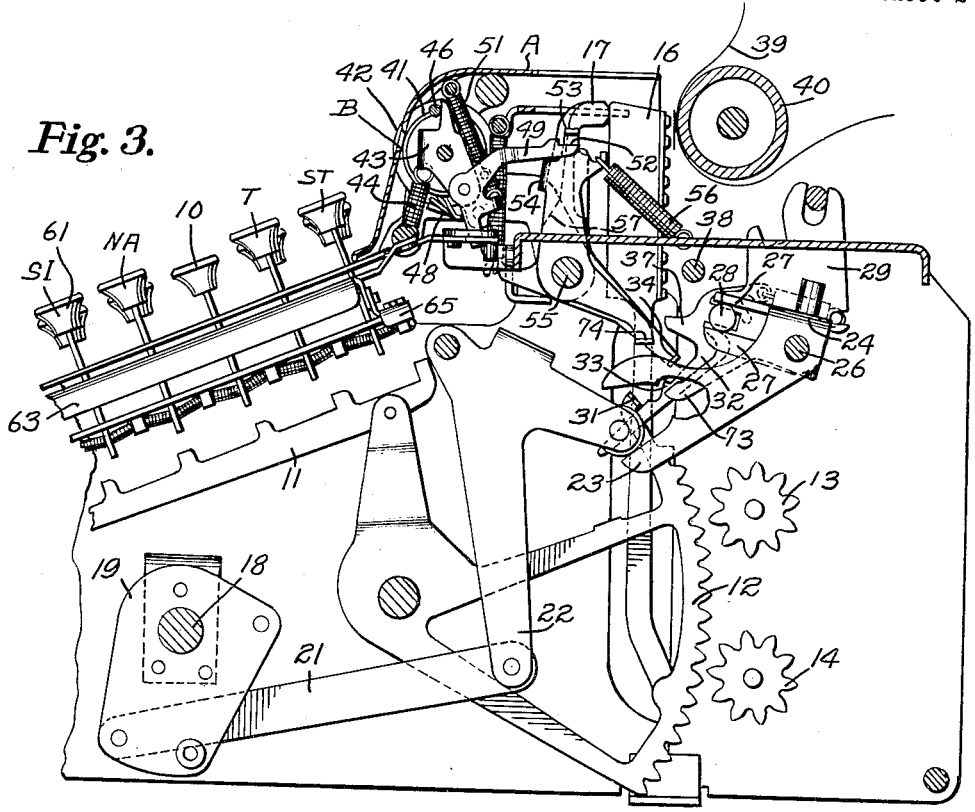
Fig. 3 is a similar view of a calculating machine and showing the counter in disabled condition.
Figure 4:
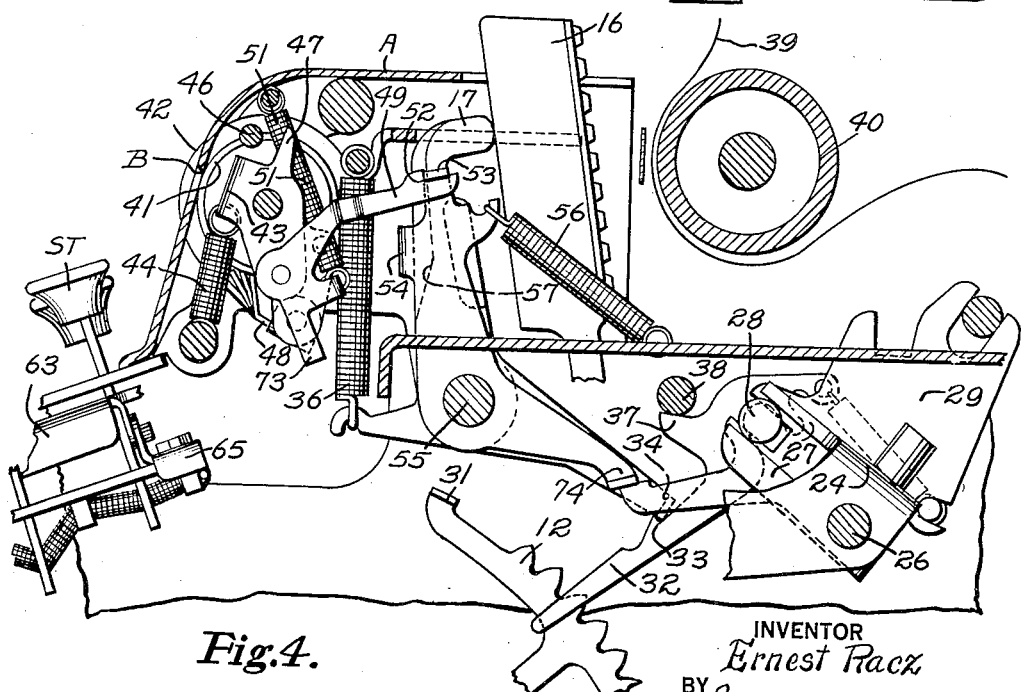
Fig. 4 is a view similar to Fig. 2 illustrating the counter in initial state of actuation.

The invention is illustrated as applied to a Burroughs portable calculating machine of the type shown in Horton Patent 1,853,050 to which reference may be made for details. It will be manifest, of course, that the invention can also be applied to calculating machines of other types.

Calculating machine in general

Briefly, the calculating machine has a plurality of banks of amount keys 10 which control the differential movements of stop bars 11 connected to actuator racks 12 with which two registers 13 and 14 are associated. The actuator racks also index and operate a printing mechanism including type bars 16 and type hammers 17.

The machine is also provided with a bank of control keys T, ST, NA, SI, etc., for conditioning the machine to perform certain functions such as totaling, sub-totaling, non-adding, the selection of registers, etc. When a total or sub-total is taken the printing mechanism is, of course, indexed and operated under the control of the registering mechanism.

The machine is operated by means of either an electric motor or by a hand crank (not shown), through a disconnectible drive in the manner illustrated in the heretofore mentioned Horton patent. The driving motor or crank oscillates the main shaft 18, the two movements being known as the forward and return stroke of the machine. The shaft 18 carries a driving plate 19 which is connected by a connecting link 21 to one arm of a bell crank 22, another arm of which carries a roller which engages a bifurcated arm 23 of a yoke 24 journaled on shaft 26. The yoke 24 has a second bifurcated arm 27 which engages a latch shaft 28 supported at one end by a plate 29, the shaft 28 and plate 29 being rocked about shaft 26 upon oscillation of the yoke 24 caused by oscillation of shaft 18.

As described in detail in the Horton patent, when each rack 12 is raised to its differential position, determined by the amount keys depressed, its type bar 16 is raised to its indexed position. Raising a rack 12 raises its lug 31 and thereby permits its latch 32 to rotate clockwise until its lug 33 engages an associated lug 34 upon the lower end of a hammer 17. Upon continued operation of the machine, shaft 28 will move clockwise about shaft 26 as a center and thereby move the proper latches 32 which in turn swing hammers 17 in a counterclockwise direction against the tension of springs 36 thereby cocking the hammers for firing. Continued movement of latches 32 will cause their shoulders 37 to engage a fixed rod 38 which will release the latches and permit the hammers to fire and strike the type bars 16 because of the tension of springs 36, to cause an imprint to be made upon the paper 39 (Fig. 5) over a platen 40. The initial retraction of hammers 17 of the printing mechanism, which also constitute part of the operating means by latches 32, is utilized to condition the machine to actuate the transaction counter as will now be described.

The printing mechanism is also provided with a section for the purpose of printing special characters to indicate totals, sub-totals, etc. This special character section prints a clear sign, the total character, when the machine is operated to take a total when there is no amount in the register.

The calculating machine is often combined with a cash drawer as shown, for example, in Patent No. 2,027,449, in which case certain controls are then provided for governing the opening of the cash drawer. The present invention is usually associated with a machine of this type in which the cash drawer is controlled as follows:

The cash drawer can be opened when the machine is operated with the total key depressed, provided there is an amount in the register at the time. In other words, if a customer buys a plurality of items these can be entered in the machine and the machine operated without opening the cash drawer and, then, when the clerk depresses the total key to get a total of these items, the cash drawer will open. In some cases depression of the total key automatically operates the machine, whereas, in other cases, the machine must be operated by hand, or a motor bar depressed.

The machine is also provided with a single item key SI, which, when depressed, permits the cash drawer to open when the machine is operated. This is to take care of cases where a customer purchases only a single item. In such event there is no occasion for entering the item in a register and then taking it out again; the item is to be retained in a register for a grand total.

These machines are usually provided with two registers 13 and 14 (Fig. 3), one called the "detail" register and the other the "grand total" register. These registers can be controlled to suit the requirements, but generally they are arranged so that each item entered in the machine goes into the "grand total" register which means, of course, that this register will give a grand total in dollars of the purchases for the day. All items, except single items, also go into the "detail" register. This "detail" register is cleared each time a total is taken and is, therefore, used for printing the totals of the customers' purchases. The "detail" register is non-added when the single item key is depressed but the single item goes into the "grand total" register.

*Counting mechanism*

As will presently appear, a counter 41 is provided and is controlled by the printing mechanism of the machine. Parts of the printing mechanism project above the main casing or housing of the machine at the rear and above the keyboard. The machine casing is provided with a narrow extension A for enclosing the projecting parts of the printing mechanism and the counter 41 which is positioned inside this casing extension A. At the front of the extension a sight opening B is provided whereby the counter can be read very easily as the numbers to be read appear to the rear and immediately above the keyboard.

The counting mechanism includes a counter 41 (Fig. 1) comprising a plurality of dials that are adapted to be advanced one unit at a time by an actuating means later described. An understanding of the details of this counter is not necessary for an understanding of the present invention and it is to be understood that any suitable form of counter may be used. The counter may be reset by means of a knurled knob 42 which projects through a suitable slot in the casing extension A.

For the purpose of actuating the counter, a yoke 43 is provided which is journaled on the counter shaft and which is urged counterclockwise by a spring 44, being limited in its counterclockwise rotation by a stop pin 46 supported by the counter side frame and which pin engages a finger 47 formed on yoke 43. In the counter shown the yoke 43 oscillates a plate 48 having staggered fingers thereon which engage ratchets between the dials of the counter to advance the dials step by step. Pivoted to an extension of the yoke 43 is a pawl 49 urged counterclockwise by a spring 51. Pawl 49 has a notch 52 upon its rearward end which is movable under certain conditions into the path of a lug 53 of a bail member 54 pivoted upon a shaft 55.

Said bail 54 is constantly urged clockwise by a spring 56. Bail 54 normally extends in front of the hammers 17 and being urged clockwise toward the hammers by spring 56, is moved counterclockwise about its pivot 55 by the hammers when they are moved counterclockwise, that is, "cocked." Consequently, if notch 52 of pawl 49 is in position to be engaged by lug 53 as bail 54 is moved counterclockwise, pawl 49 will likewise be moved to actuate the counter one step of movement.

It is not desired, however, to operate the counting mechanism when the machine is operated to take a total when the register is clear.

When the machine is so operated a part of the printing mechanism, namely, the special character section, operates to print a clear sign.

To prevent counting under such an operation the hammer 17 associated with the special character type bar, that is, the hammer at the right hand side of the machine, has its forward edge cut away as at 57 so that when this hammer is moved it will not engage the bail 54 to rock the latter. Consequently, even though the shoulder 52 of the pawl 49 has been moved into the path of the lug 53 the bail 54 will not be rocked if the only hammer that is cocked and fired is the cut away hammer associated with the special character type bar. This means that operation of the special character part of the printing mechanism will not operate the counter.

This construction of the special character section of the printing mechanism does not, however, interfere with the operation of the counter at the proper time because, when a total is taken with an amount in the registering mechanism, certain others of the hammers will be cocked and fired and these other hammers will operate to cause an operation of the counting mechanism.

From the above it will be evident that, if the parts are properly positioned, the counting mechanism will be actuated by operation of the printing mechanism. It then becomes necessary to consider the condition under which the printing mechanism operates. There are two conditions under which the type bars are indexed and the hammers cocked and fired.

First, if one or more amount keys are depressed and the machine operated, the printing mechanism will operate to print the amount entered on the keys.

Second, when a total is taken with an amount in the register, the type bars are indexed and the hammers fired under the control of the register.

Considering the first condition, namely, depression of the amount keys, it is not desirable, as previously mentioned, to count every cycle of operation in which the printing mechanism is indexed and operated under control of the amount keys, because some customers purchase more than a single item. To take care of this, the parts are arranged to remove pawl 49 from the path of lug 53 under these conditions so that the mere operation of the printing mechanism under the control of the amount keys does not actuate the counter.

But, when a customer purchases only a single item, it is desirable to count the operation of the machine, which operation is one in which the printing mechanism is operated under control of the amount keys. Accordingly, certain parts are put under the control of the "single item" key as follows:

Control by single item key

Referring to Fig. 1, bail 63 is pivotally mounted adjacent the bank of control keys upon a forward bracket 64 and a rear bracket 65. This bail is provided with a plurality of lugs 66 positioned to be engaged by the inclined or cam edges 67 of one or more of the control keys. In the embodiment illustrated lugs are provided for the "single item" key 61 and for the total key T.

The bail 63 is connected to the counter through an angularly shaped link 68 connecting the rear end of bail 63 to one arm of a bell crank 69 pivoted to a fixed bracket 71. Said bell crank is constantly urged in a counterclockwise direction by a tension spring 72 having one end secured to the link 68 and the other end secured to the fixed bracket 71. The other arm of bell crank lever 69 engages a downwardly projecting finger 73 of pawl 49 and due to spring 72, normally holds the notch 52 of the pawl 49 out of the path of the lug 53 of bail 54. The counter which, in a sense, may be termed a specific operating or function performing mechanism of the machine, is therefore, normally disabled although the pawl 49 is normally urged into operative position by spring 51 which is of lesser tension than the spring 72.

With the above construction, if a customer purchases only a single item, the clerk enters the amount of this item on the amount keys, depresses the "single item" key, and operates the machine. Depression of the "single item" key moves the bail 63 and causes the pawl 49 to be moved into the path of the lug 53. When the machine is operated, the printing mechanism operates under the control of the amount keys and, since the pawl 49 is in the path of the lug 53, it follows that the counting mechanism will count this cycle of operation in the machine.

Control by total key

When a customer purchases more than one item the "single item" key is not depressed, but, at the end of the listing of the purchases, the operator depresses the total key T, which, as previously mentioned, causes the printing mechanism to operate under the control of the registering mechanism. This total taking cycle is one that should be counted.

Accordingly, the bail 63 is, as previously mentioned, provided with a lug 66 adjacent the stem of the total key so that, when the total key is depressed, the bail 63 will be moved to position pawl 49 into the path of the lug 53. Then, as the printing mechanism operates, the counter will be advanced one step.

Because of the considerable variation in movement of the type hammers in different machines, it is preferred that the type hammers be utilized to initiate only the starting movement of bail 54 and additional means is provided for completing that movement and insuring constant and uniform movement of the bail 54. For this purpose the plate 29 (Fig. 2), which is always moved a constant distance at each operation of the machine, is provided with a forwardly extending arm 73 which after initial movement of bail 54 by the cocking hammers engages an offset lug of a rearwardly extending arm 74 depending from bail 54. Bail 54 is therefore moved a constant distance at each operation of the machine and therefore positively and definitely advances the counter one step for each selected operation of the machine. If bail 54 has not been initially moved by the hammers, lug 74 will not be in the path of movement of arm 73 as can be seen from Fig. 3 and the plate 29 will not, therefore, actuate the item counter which will then be inoperative.

Operation

The operation should be clear from the preceding description but it will be briefly summarized.

Normally the arm 69 engages the extension 73 to hold a notch 52 of pawl 49 below the path of the lug 53. As long as the parts remain in this position the counter will not be operated.

If an item is entered on the amount keys and the machine operated without depressing the total key or the "single item" key, the printing mechanism will operate but the hammers will not operate the counter because the notch 52 of pawl 49 remains below the path of lug 53.

If, however, the "single item" key is depressed at the same time that the amount keys are depressed, the bail 63 is cammed clockwise which moves lever 69 out of engagement with fingers 73 and permits pawl 49 to be rocked counter-clockwise by a spring 51 to place the shoulder 52 into the path of lug 53. Then, when the printing mechanism is operated, the counter will be actuated and the cycle of operation of the machine will be counted.

If, instead of depressing amount keys, a total key is depressed to take a total from the register, as it would be when a clerk is taking a total of a customer's purchases involving more than one item, the pawl 49 will be released as just explained for the "single item" key and, when the total is taken, the printing mechanism will operate to actuate the counter.

But, if the total key is depressed when the register is clear, the only parts of the printing mechanism that will be operated are the parts in the special character section and these parts will not move the bail 54. Accordingly, the pawl 49 will not be moved and the counter will not be actuated to count this cycle of operation of the machine.

It follows from the foregoing that a machine has been provided which will count certain transactions such as the number of customers and will not count cycles of operation of the machine of which a record is not desired.

The particular construction and arrangement of the bail 63 makes it possible to manufacture only one type of bail and then alter this to suit the particular needs as the occasion demands in the assembly of the machine, or as substitution may be necessary for the purpose of altering machines. One of the advantages of the construction is that the control of the counting mechanism may be easily varied. For example, the bail 63 is manufactured with lugs 66 for each of the control keys, and the lugs that are not desired are then cut off, which enables the assembler to easily adapt the machine to various requirements. Also, after the machine has been built if it is desired to vary the control by the control keys, the bail 63 may be removed and another substituted having a different set of lugs on it.

It will be apparent to those skilled in the art that changes may be made in the details of construction without departing from the spirit and scope of the invention as defined in the appended claims.

I claim:

1. A calculating machine having means for giving said machine cycles of operation, amount keys, a plurality of control keys for conditioning the machine to perform certain functions, a registering mechanism, a printing mechanism operable during a cycle of operation of the machine under the control of said amount keys or said registering mechanism, a counting mechanism for counting cycles of operation of said machine, and actuating means for said counting mechanism having an element conditioned by depression of one of said control keys and actuated by an element of said printing mechanism when the latter is operated for causing said counting mechanism to count a cycle of operation of said machine.

2. A calculating machine having means for giving said machine cycles of operation, manipulative amount keys, total taking means, a printing mechanism operated during each operation of the machine when an amount key is depressed or when the total taking means is conditioned for total taking with an amount in said registering mechanism, a counting mechanism operable to count cycles of operation of the machine, and means actuated and controlled by an element of said printing mechanism and said total taking means requiring that said printing mechanism be operated and that said total taking means be conditioned for total taking in order that said counting mechanism be conditioned to function when the machine is given a cycle of operation.

3. A calculating machine having means for giving it cycles of operation, a plurality of amount keys, a total key, a single item key, a registering mechanism, a counting mechanism operable to count cycles of operation of said machine, and actuating means for said counting mechanism having elements conditioned under control of at least one of said amount keys together with said single item key or the depression of said total key while there is an amount in said registering mechanism, to cause said counting mechanism to function when said machine is given a cycle of operation.

4. A calculating machine having amount keys and control keys, means for operating said machine, counting mechanism for counting certain operations of said machine, printing mechanism comprising type bars and type hammers, means for operating said counter comprising a bail engageable with certain of said type hammers and a pawl movable into and out of the path of movement of said bail, and means actuated by one of said control keys for positioning said pawl in the path of said bail, said latter means comprising a pivoted bail having lugs thereon engageable with certain of said control keys.

5. A calculating machine having amount keys and control keys, means for operating said machine, counting mechanism for counting transactions entered in said machine, printing mechanism including type bars and type hammers, means for operating said counter comprising a bail engageable with certain of said type hammers and a pawl movable into and out of the path of movement of said bail, and means actuated by one of said control keys for positioning said pawl in the path of said bail.

6. A calculating machine having amount keys and control keys, means for operating said machine, counting mechanism for counting transactions entered in said machine, means for controlling the operation of said counting mechanism to condition the counting mechanism to function upon operation of said machine, printing means for printing the items entered in said machine, the operation of said counting mechanism being initiated by an element of said printing means, and means for insuring uniform operation of said counting means after being initiated by said printing means.

7. A calculating machine having depressible amount keps and depressible control keys, means for operating said machine, counting mechanism associated with said operating means for counting transactions made by said machine and means for actuating said counting mechanism having an element conditioned by means under control of at least one of said control keys and an element conditioned by the entry or presence of an amount in said machine to cause the counting mechanism to function upon operation of said machine and comprising means for urging one of said elements into active position, means for preventing operation of said urging means, and means controlled by one of said control keys for disabling said latter mentioned means.

8. A calculating machine having depressible amount keys and depressible control keys, means for operating said machine, counting mechanism associated with said operating means for counting certain transactions of said machine and means for actuating said counting mechanism having an element conditioned by means under control of at least one of said control keys and an element conditioned by the entry or presence of an item in said machine to cause the counting mechanism to function upon operation of said machine, and comprising means for maintaining one of said elements inactive, and means controlled by one of said control keys for disabling said maintaining means.

9. A calculating machine having depressible amount keys and depressible control keys, means for operating said machine, printing mechanism for printing the items entered in said machine, a counting mechanism for counting certain transactions entered in said machine, and means for controlling said counting mechanism requiring the depression of at least one of said control keys, the operation of said counting mechanism being initiated by an element of said printing mechanism.

10. A calculating machine having depressible amount keys and depressible control keys, means for operating said machine, printing mechanism comprising type bars and type hammers for printing the items entered in said machine, a counting mechanism for counting transactions entered in said machine, and means for controlling said counting mechanism requiring the depression of at least one of said control keys to condition the counting mechanism to function, said counting mechanism being operated by certain hammers of said printing mechanism.

11. A calculating machine having depressible amount keys and depressible control keys, means for operating said machine, printing mechanism comprising type hammers, a counting mechanism for counting transactions made by said machine, and means for controlling said counting mechanism requiring the depression of at least one of said control keys to condition the counting mechanism to function, said counting mechanism being operated by certain hammers of said printing mechanism, and being unaffected by one of said printing hammers.

12. A calculating machine having a keyboard, a register for accumulating entries in said machine, a substantially rectangular housing enclosing said machine, a printing mechanism having portions projecting above said housing at the rear of said keyboard, an extension of said housing enclosing said projecting portions of said printing mechanism, and a transaction counter displaced from said register in said casing extension and controlled by an element of said printing mechanism, said casing extension having a sight opening to the rear and above said keyboard so that said counter can be readily read above and immediately to the rear of said keyboard.

13. A calculating machine having a register mechanism manipulative amount keys and manipulative control keys, means for operating said machine, printing mechanism actuated thereby under control of said amount keys for printing the items entered into said machine, a function performing mechanism, means for actuating said function performing mechanism, and means for controlling elements of said latter means jointly from an element of said printing mechanism at each operation of said printing mechanism and at least one of said control keys.

14. A calculating machine having a register mechanism manipulative amount keys and manipulative control keys, means for operating said machine, printing mechanism actuated thereby for printing the items entered into said machine, a counting mechanism removed from and independent of said registering mechanism for counting certain operations of said machine, means for actuating said counting mechanism, and means for controlling elements of said latter means jointly from an element of said printing mechanism and at least one of said control keys.

15. A calculating machine having manipulative amount keys and manipulative control keys, a register for accumulating items entered in said machine, means for operating said machine, a printing mechanism operated thereby, counting mechanism for counting certain operations of said machine, means for actuating said counting mechanism upon operation of said machine, and means for controlling elements of said actuating means requiring the depression of at least one of said control keys and the printing of an amount to condition the counter actuating means to function upon operation of said machine.

16. A calculating machine having means for giving said machine cycles of operation, amount keys, a plurality of control keys for conditioning the machine to perform certain functions, a registering mechanism, a printing mechanism operable during a cycle of operation of the machine under the control of said amount keys or said registering mechanism, a counting mechanism for counting cycles of operation of said machine, and actuating means for said counting mechanism having elements conditioned by depression of one of said control keys and operation of said printing mechanism for causing said counting mechanism to count a cycle of operation of said machine.

17. A calculating machine having manipulative amount keys on which items may be entered, a registering mechanism, a total taking means for taking a total of a group of items constituting a single transaction, a printing mechanism operable to print the amount of each item as it is entered in the machine and the amount of the total of each multiple item transaction, a transaction counter, normally disabled mechanism for actuating said counter, means operable to condition said machine for entry of a single item transaction, and means controlled by said single item conditioning means and by said total taking means for enabling an element of said counter actuating means to cause said counter to count all single item transactions and multiple item transactions, counting one unit only for each of the latter transactions.

18. A calculating machine having means for giving said machine cycles of operation, manipulative amount keys, manipulative control keys for conditioning the machine to perform certain functions, a registering mechanism, a printing mechanism operable during a cycle of operation of the machine under control of said amount keys or said registering mechanism, a single counting mechanism for counting all complete transactions entered in said machine including single item transactions and multiple item transactions, and actuating means for said counting mechanism having an element conditioned by depression of one of said control keys for counting single item transactions and another of said control keys for counting multiple item transactions.

19. A calculating machine having means for giving said machine cycles of operation, manipulative amount keys, manipulative control keys including a single item key and a total key for conditioning said machine to perform a single item transaction and totaling a multiple item transaction, respectively, a registering mechanism, a printing mechanism operable during a cycle of operation of the machine under control of said amount keys or said registering mechanism, a single counting mechanism for counting all complete transactions entered in said machine including single item transactions and multiple item transactions, and actuating means for said counting mechanism having elements conditioned under control of an amount key and of said single item key for counting single item transactions and by an amount in said register and depression of said total key for counting multiple item transactions.

20. A calculating machine having a registering mechanism, depressible amount keys, and depressible operation keys, operating means for operating said machine, printing mechanism comprising type bars and type hammers, a counting mechanism for counting items entered in said machine, and means for controlling said counting mechanism having an element conditioned by means under control of at least one of said operation keys and an element conditioned by the entry or presence of an amount in said registering mechanism to condition the counting mechanism to function, one of said elements being operated by certain hammers of said printing mechanism and being unaffected by one of said printing hammers.

ERNEST RACZ.